(12) United States Patent
Jeong

(10) Patent No.: US 9,212,797 B2
(45) Date of Patent: Dec. 15, 2015

(54) VEHICLE-TIRE CHOCK HAVING A LIGHT-EMITTING PORTION

(76) Inventor: Yeonseok Jeong, Seoul (KR)

( * ) Notice: Subject to any disclaimer, the term of this patent is extended or adjusted under 35 U.S.C. 154(b) by 271 days.

(21) Appl. No.: 13/883,760

(22) PCT Filed: Nov. 10, 2011

(86) PCT No.: PCT/KR2011/008536
§ 371 (c)(1),
(2), (4) Date: May 6, 2013

(87) PCT Pub. No.: WO2012/064114
PCT Pub. Date: May 18, 2012

(65) Prior Publication Data
US 2013/0223048 A1    Aug. 29, 2013

(30) Foreign Application Priority Data

Nov. 10, 2010 (KR) .................. 10-2010-0111527

(51) Int. Cl.
*B60T 3/00* (2006.01)
*F21S 9/02* (2006.01)
*B60P 3/077* (2006.01)
*B62B 1/02* (2006.01)
*B65G 69/00* (2006.01)

(52) U.S. Cl.
CPC . *F21S 9/02* (2013.01); *B60P 3/077* (2013.01); *B60T 3/00* (2013.01); *B62B 1/02* (2013.01); *B65G 69/005* (2013.01)

(58) Field of Classification Search
CPC .......................................... B60T 3/00
See application file for complete search history.

(56) References Cited

U.S. PATENT DOCUMENTS

| 4,833,442 | A  | * | 5/1989  | Von Heck ................. 340/427 |
| 5,549,410 | A  | * | 8/1996  | Beryozkin et al. ............. 404/6 |
| 6,336,527 | B1 | * | 1/2002  | Metz ............................ 188/32 |
| 7,226,265 | B2 |   | 6/2007  | Wilson |
| 8,590,674 | B2 | * | 11/2013 | Jette ........................... 188/32 |
| 2003/0159892 | A1 | * | 8/2003 | Jette ........................... 188/32 |
| 2005/0226705 | A1 | * | 10/2005 | Wilson ..................... 414/401 |

FOREIGN PATENT DOCUMENTS

| JP | 07-277159 A | 10/1995 |
| JP | 2002-114145 A | 4/2002 |
| KR | 20-2009-0010083 U | 10/2009 |

* cited by examiner

*Primary Examiner* — Elmito Breval
(74) *Attorney, Agent, or Firm* — Revolution IP, PLLC

(57) ABSTRACT

Disclosed is a vehicle-tire chock having a light-emitting portion that emits light to make the vehicle-tire chock visible outside the vehicle. The light-emitting portion is formed in the vehicle-tire chock so as to make the chock conspicuous, thus preventing negligent accidents in advance by enabling a vehicle driver to recognize the presence of the chock before getting into the vehicle, by enabling other vehicles or pedestrians to easily recognize a large parked or stopped vehicle, and by enabling the vehicle-tire chock to be easily visible at night.

8 Claims, 3 Drawing Sheets

VEHICLE-TIRE CHOCK HAVING A LIGHT-EMITTING PORTION

CROSS REFERENCE TO PRIOR APPLICATIONS

This application is a National Stage Application of PCT International Patent Application No. PCT/KR2011/008536 filed on Nov. 10, 2011, under 35 U.S.C. §371, which claims priority to Korean Patent Application No. 10-2010-0111527 filed on Nov. 10, 2010, which are all hereby incorporated by reference in their entirety.

TECHNICAL FIELD

The present invention relates to a vehicle-tire chock, and more particularly, to a vehicle-tire chock having a light-emitting portion.

BACKGROUND ART

Since various large vehicles such as concrete mixing transport trucks and trucks have great weights and heavy loads thereon, it is difficult for the various large vehicles to maintain perfect stopped states only with brake systems not only on slopes but even on flat roads. Accordingly, when a vehicle-tire chock is placed in front of or behind a wheel while a vehicle such as a fire engine or a truck is parked or stopped, the vehicle may be effectively prevented from sliding backward due to its weight or the weight of a load thereon, thereby preventing negligent accidents due to unsafe parking or stopping.

However, news reports sometimes say that some large vehicle drivers with a lack of safety awareness do not place vehicle-tire chocks around their vehicles on slopes and thus the vehicles have run into other vehicles or houses. It is said that more accidents than those which are reported occur.

When returning to a vehicle after an emergency rescue operation, a regular inspection of structures, or a firefighting operation, a driver often forgets to remove a vehicle-tire chock placed under a wheel of the vehicle and simply starts the vehicle. In this case, the vehicle-tire chock may be lost or damaged, the wheel and the vehicle itself may be damaged, and additional safety-related accidents may occur.

In particular, since a vehicle-tire chock is not highly visible at night, there are many cases in which a vehicle is started without removing the vehicle-tire chock and other vehicles or pedestrians collide with a vehicle which is parked or stopped.

DISCLOSURE

Technical Problem

The present invention is directed to providing a vehicle-tire chock having a light-emitting portion that emits light and makes the vehicle-tire chock conspicuous, which may prevent safety-related accidents in advance by enabling a driver to recognize the presence of the vehicle-tire chock before getting into the vehicle, enabling other vehicles or pedestrians to easily recognize the presence of the vehicle which is parked or stopped, and enabling the vehicle-tire chock to be easily visible even at night

Technical Solution

One aspect of the present invention provides a vehicle-tire chock for preventing a wheel of a vehicle from moving, the vehicle-tire chock including a light-emitting portion that emits light and makes the vehicle-tire chock visible to the naked eye outside the vehicle.

The light-emitting portion may include a plurality of light-emitting diode (LED) bulbs.

The light-emitting portion may be turned on when a weight equal to or greater than a predetermined weight is applied to the vehicle-tire chock and may be turned off when a weight less than the predetermined weight is applied to the vehicle-tire chock.

The light-emitting portion may include a plurality of bulbs, and only some of the plurality of bulbs are turned on according to user settings.

The light-emitting portion may blink on and off in order to make the vehicle-tire chock visible to the naked eye outside the vehicle.

The light-emitting portion may be provided on a side surface or a surface opposite to a surface of the vehicle-tire chock on which the wheel of the vehicle is placed.

The vehicle-tire chock may further include a handle that is provided on at least one surface of a side surface and a surface opposite to a surface of the vehicle-tire chock on which the wheel of the vehicle is placed.

The light-emitting portion may be provided on the handle.

The vehicle-tire chock may further include a reflective plate that reflects light and is attached to at least one surface of a side surface and a surface opposite to a surface of the vehicle-tire chock on which the wheel of the vehicle is placed.

Advantageous Effects

According to the present invention, a vehicle-tire chock having a light-emitting portion that emits light and makes the vehicle-tire chock conspicuous may prevent safety-related accidents in advance by enabling a driver to recognize the presence of the vehicle-tire chock before getting into the vehicle, enabling other vehicles or pedestrians to easily recognize the presence of the vehicle which is parked or stopped, and enabling the vehicle-tire chock to be easily visible even at night

BEST MODE OF THE INVENTION

Figure 1:
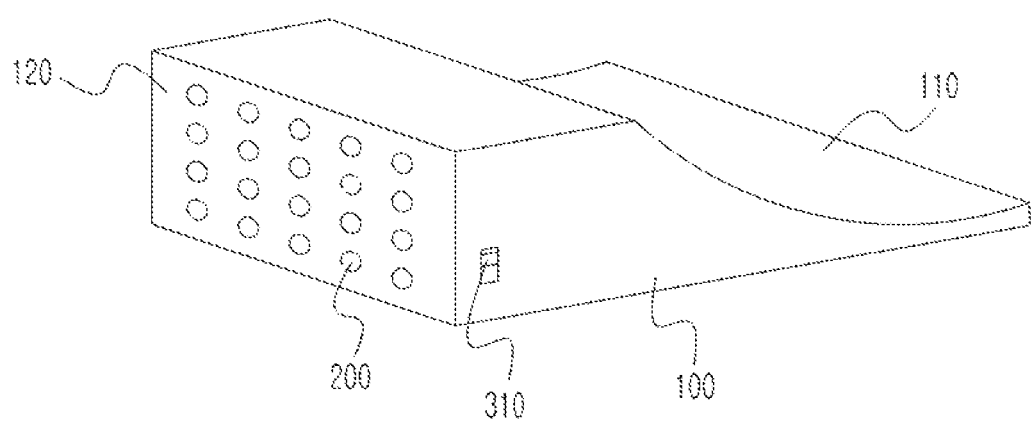
FIG. 1 is a perspective view illustrating a vehicle-tire chock having a light-emitting portion according to an embodiment of the present invention.

Hereinafter, embodiments of the present invention will be explained in detail with reference to the attached drawings in order to enable one or ordinary skill in the art to embody and practice the invention. In the following description of the present invention, only essential parts necessary to understand operation of the present invention will be explained and other parts will not be explained when they are deemed to unnecessarily obscure the subject matter of the invention.

Also, elements having similar functions and operations are denoted by the same reference numerals in the drawings.

Throughout the specification, it will be understood that when an element is referred to as being "connected" to another element, it may be "directly connected" to the other element or "connected" to the other element with intervening elements therebetween. It will be further understood that when a part "includes" or "comprises" an element, unless otherwise defined, the part may further include other elements, not excluding the other elements.

Figure 2:
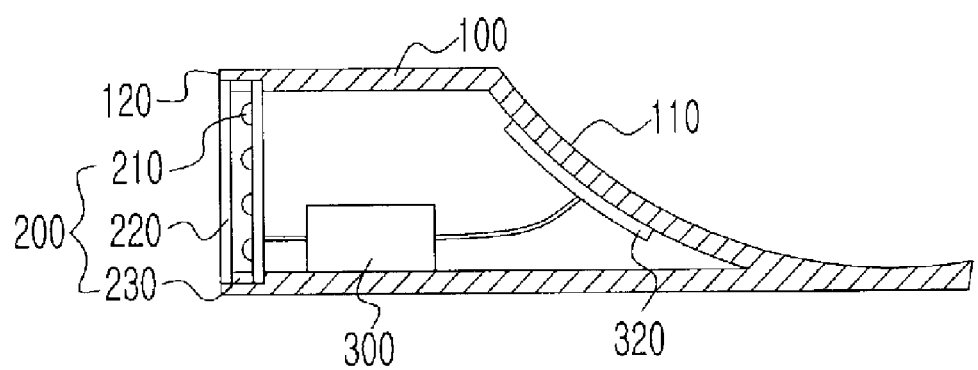
FIG. 2 is a cross-sectional view illustrating the vehicle-tire chock of FIG. 1.

FIG. 1 is a perspective view illustrating a vehicle-tire chock having a light-emitting portion 200 according to an embodiment of the present invention. FIG. 2 is a cross-sectional view illustrating the vehicle-tire chock of FIG. 1. Referring to FIGS. 1 and 2, the vehicle-tire chock may include a body 100 and the light-emitting portion 200. The vehicle-tire chock may further include a power supply unit 300, a switch 310, and a sensor 320.

[Modes of the Invention]

The body 100 which forms an overall outer appearance of the vehicle-tire chock may have the same shape as a typical vehicle-tire chock. A surface of the body 100 on which a wheel of a vehicle is placed may be inclined to contact the wheel of the vehicle and an opposite surface may be substantially vertical. For convenience of explanation, the surface on which the wheel of the vehicle is placed is referred to as a front surface 110 and the opposite surface is referred to as a rear surface 120.

A material of the body 100 may not be limited to wood as indicated by the vehicle-tire chock. The body 100 may be formed of wood, a metal, rubber, or a combination thereof, and the present embodiment is not limited thereto. Preferably, considering that a vehicle-tire chock is usually used when a large vehicle such as a truck or a fire engine is parked or stopped, the body 100 may be formed by forming a frame made of a steel plate and winding rubber around an outer surface of the frame to have a predetermined strength, absorb impact, and prevent sliding.

The light-emitting portion 200 may emit light and thus may make the vehicle-tire chock easily visible to the naked eye outside the vehicle. Since the vehicle-tire chock includes the light-emitting portion 200, a driver of the vehicle may easily recognize the presence of the vehicle-tire chock before boarding the vehicle, and thus may start the vehicle after removing the vehicle-tire chock. Also, other drivers or pedestrians may easily recognize the presence of the vehicle-tire chock and recognize that the vehicle is parked or stopped, and thus may avoid the vehicle. The light-emitting portion 200 may be provided on the rear surface 120 of the body 100, a side surface, or both the rear surface 120 and the side surface.

Referring to FIG. 2, the light-emitting portion 200 may include bulbs 210, a front plate 220, and a frame 230. The power supply unit 300 may supply power to the light-emitting portion 200.

That is, the light-emitting portion 200 emits light using the bulbs 210. The bulbs 210 may be a plurality of light-emitting diode (LED) bulbs. However, the light-emitting portion 200 need not include the bulbs 210 in order to emit light, and may include another light-emitting material. The light-emitting portion 200 may blink on and off in order to make the vehicle-tire chock visible to the eyes outside the vehicle. This is because the light-emitting portion 200 is more visible when blinking on and off than when it is continuously turned on.

The front plate 220 functions to scatter light emitted by the bulbs 210 and protect the bulbs 210. The front plate 220 may be formed of a reinforced plastic which has high resistance to external impact. Since light of the bulbs 210 has to be emitted to the outside, the front plate 220 may be preferably formed of a material which is transparent to some extent. The front plate 220 may have a noticeable color. In order to attach the front plate 220 to the body 100, the frame 230 may be used.

The power supply unit 300 for supplying power to the light-emitting portion 200, more specifically, to the bulbs 210, may use a battery or a rechargeable battery. Power may be preferably supplied to the light-emitting portion 200 only when the vehicle-tire chock is placed under the wheel of the vehicle. If power is continuously supplied and the light-emitting portion 200 continuously emits light irrespective of a use state, energy may be wasted, the eyes may be dazed by the light-emitting portion 200 being stored, and other people may feel uncomfortable. Accordingly, the switch 310 or the sensor 320 may be further provided in order to adjust power supply.

The switch 310 may be provided on a side surface of the body 100 as shown in FIG. 1. Alternatively, the switch 310 may be provided on a top surface or the front surface 110. Assuming that the switch 310 is provided on the front surface 110, when the wheel of the vehicle is placed on the front surface 110, the switch 310 may be automatically turned on to supply power to the light-emitting portion 200. However, in this case, since the vehicle has a great weight and thus there is a risk of damage, the switch 310 should be formed of a very strong material.

When the sensor 320 recognizes that the wheel of the vehicle is placed on the front surface 110 of the body 100, power may be supplied to the light-emitting portion 200. The sensor 320 may be a metal sensor or a weight sensor. Considering that the vehicle-tire chock may be formed of a metal and may be stored in the vehicle when not being used, it is preferable to use a weight sensor. That is, when the vehicle-tire chock further includes the sensor 320 which is a weight sensor, the light-emitting portion 200 may be turned on when a weight equal to or greater than a predetermined weight is applied to the vehicle-tire chock and may be turned off when a weight less than the predetermined weight is applied to the vehicle-tire chock. Once the power supply to the light-emitting portion 200 is adjusted using the sensor 320, when the vehicle-tire chock is removed, the light-emitting portion 200 is automatically turned off, thereby making it unnecessary to turn off the light-emitting portion 200 by turning off the switch 310. Since the vehicle-tire chock allows the wheel of the vehicle to be placed thereon and thus the predetermined weight for supplying power is very great, even when an object is placed on the vehicle-tire chock which is being stored, there is no risk of the light-emitting portion 200 being turned on.

Figure 3:
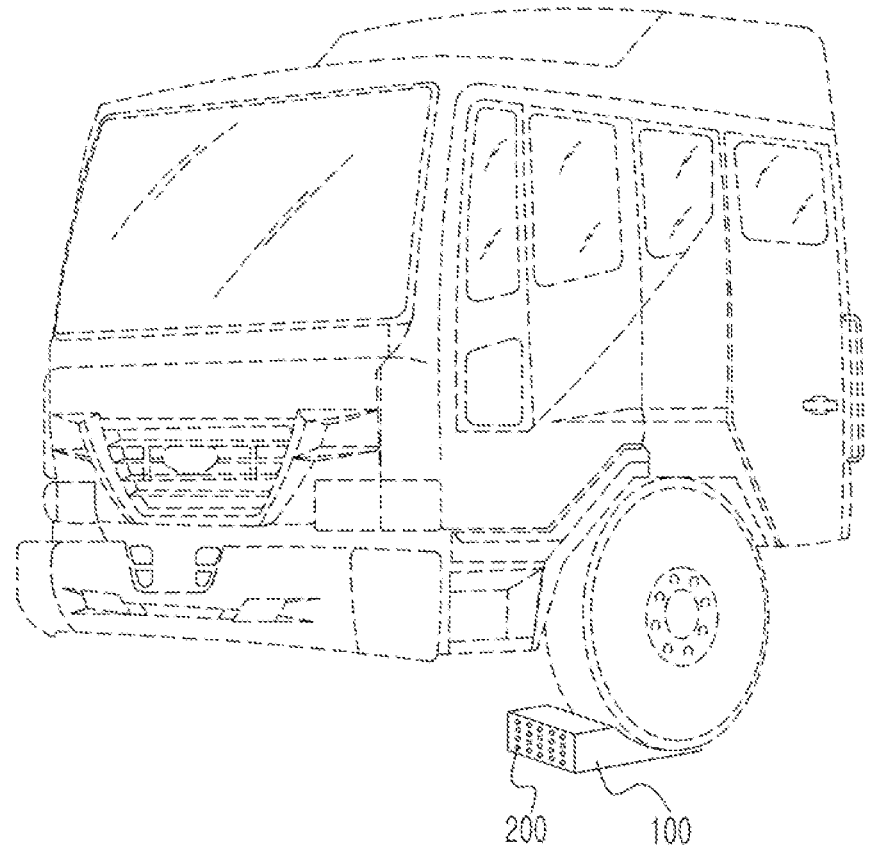
FIG. 3 is a view illustrating a state in which the vehicle-tire chock of FIG. 1 is used.

FIG. 3 is a view illustrating a state in which the vehicle-tire chock of FIG. 1 is used. Referring to FIG. 3, the vehicle-tire chock is used such that the front surface 110 of the body 100 is placed under a front wheel or a rear wheel of the vehicle. Since the light-emitting portion 200 is turned on to emit light once the vehicle-tire chock is placed, the vehicle-tire chock becomes conspicuous, thereby preventing safety-related accidents.

Figure 4:
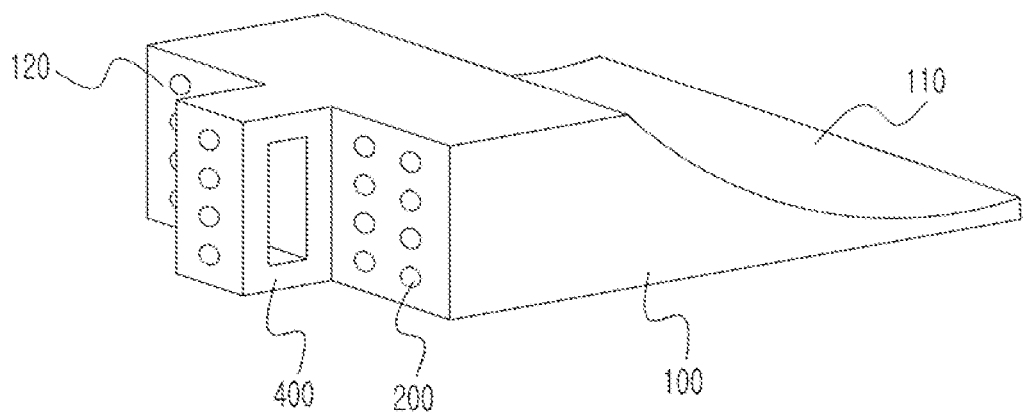
FIG. 4 is a perspective view illustrating a vehicle-tire chock having a light-emitting portion according to another embodiment of the present invention.

FIG. 4 is a perspective view illustrating a vehicle-tire chock having the light-emitting portion 200 according to another embodiment of the present invention. Referring to FIG. 4, the vehicle-tire chock may further include a handle 400 that is provided on at least one surface of a side surface and a surface (that is, the rear surface 120) opposite to a surface (that is, the front surface 110) on which the wheel of the vehicle is placed. The vehicle-tire chock may be easily carried and placed using the handle 400. Although the handle 400 and the rear surface 120 of the body 100 are integrally formed with each other in FIG. 4, the present embodiment is not limited thereto and the handle 400 may be attached to the body 100 or the handle 400 may be movably attached to the body 100. When the handle 400 protrudes away from the rear surface 120 as shown in FIG. 4, the light-emitting portion 200 may be provided on the handle 400.

Figure 5:
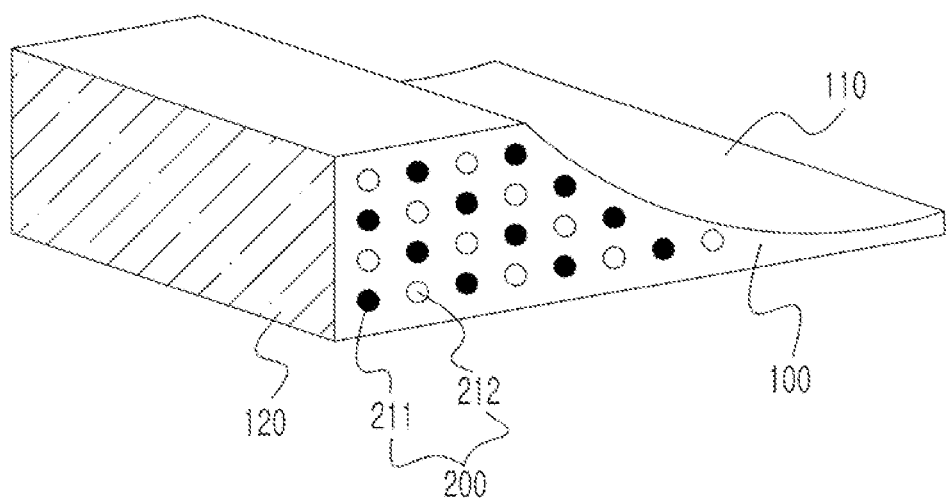
FIG. 5 is a perspective view illustrating a vehicle-tire chock having a light-emitting portion according to another embodiment of the present invention.

FIG. 5 is a perspective view illustrating a vehicle-tire chock having the light-emitting portion 200 according to another embodiment of the present invention. Referring to FIG. 5, the light-emitting portion 200 may include the plurality of bulbs 210, and some bulbs (for example, 211 or 212) among the plurality of bulbs 210 may be turned on according to a user's selection, thereby saving energy. Also, the vehicle-tire chock may become more conspicuous by alternately turning on some bulbs 211 and the remaining bulbs 212.

The vehicle-tire chock may include a reflective plate that reflects light and is provided on at least one surface of a side surface and a surface (that is, the rear surface 120) opposite to a surface (that is, the front surface 110) on which the wheel of the vehicle is placed. The reflective plate may function to reflect light and make the vehicle-tire chock visible to the eyes even at night. When the light-emitting portion 200 and the reflective plate are used together, the vehicle-tire chock may become more conspicuous and sufficient effects may be achieved even when only some bulbs 211 or 212 from among the bulbs 210 of the light-emitting portion 200 are turned on.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A vehicle-tire chock for preventing a wheel of a vehicle from moving, the vehicle-tire chock comprising:
 a body that forms an outer appearance of the vehicle-tire chock and comprises a front surface which is inclined and on which the wheel of the vehicle is placed;
 a light-emitting portion that is provided on at least one of a rear surface and a side surface of the body and emits light to make the vehicle-tire chock visible to the naked eye outside the vehicle, wherein a reflective plate is provided at the rear surface or the side surface corresponding to the light-emitting portion;
 a sensor that detects a weight of the vehicle applied to the front surface of the body; and
 a power supply unit that is electrically connected to the sensor, and selectively supplies or disconnects power to the light-emitting portion with following conditions:
 in response to detection of the weight detected by the sensor is equal to or greater than a predetermined weight, the power supply unit supplies power to the light-emitting portion,
 in response to detection of the weight detected by the sensor is less than the predetermined weight,
 the power supply unit disconnects power to the light-emitting portion.

2. The vehicle-tire chock of claim 1, wherein the light-emitting portion comprises a front plate, a bulb, and a frame to which the front plate is attached, wherein the front plate functions to scatter light emitted by the bulb and protect the bulb, and is formed of a reinforced plastic through which the light of the bulb is emanated to the outside.

3. The vehicle-tire chock of claim 1, wherein the light-emitting portion comprises a plurality of light-emitting diode (LED) bulbs.

4. The vehicle-tire chock of claim 1, wherein the power supply unit supplies power using a battery or a rechargeable battery.

5. The vehicle-tire chock of claim 1, wherein the power supply unit comprises a switch that is provided on an outer surface of the body and manually adjusts power supply to the light-emitting portion, wherein, when the switch is turned off, power supply to the light-emitting portion is cut off.

6. The vehicle-tire chock of claim 1, comprising a handle that is provided on at least one of the side surface and the rear surface opposite to the front surface to easily carry and place the vehicle-tire chock, wherein the light-emitting portion is provided on the handle.

7. The vehicle-tire chock of claim 1, wherein the light-emitting portion comprises a plurality of LED bulbs, wherein the plurality of LED bulbs are driven according to user settings such that all of the plurality of LED bulbs are turned on, only some of the plurality of LED bulbs are turned on, or some of the plurality of LED bulbs and the remaining LED bulbs are alternately turned on.

8. The vehicle-tire chock of claim 1, wherein the body is formed by forming a frame made of a metal plate and covering an outer surface of the frame with a rubber in order to have a predetermined strength, absorb impact, and prevent sliding.

\* \* \* \* \*